United States Patent
Hagiwara

(10) Patent No.: US 12,429,707 B2
(45) Date of Patent: Sep. 30, 2025

(54) LENS DRIVING DEVICE, CAMERA DEVICE, AND ELECTRONIC APPARATUS

(71) Applicant: New Shicoh Motor Co., Ltd., Zhejiang (CN)

(72) Inventor: Kazuyoshi Hagiwara, Kanagawa (JP)

(73) Assignee: New Shicoh Motor Co., Ltd., Jiashan (CN)

( * ) Notice: Subject to any disclaimer, the term of this patent is extended or adjusted under 35 U.S.C. 154(b) by 751 days.

(21) Appl. No.: 17/539,369

(22) Filed: Dec. 1, 2021

(65) Prior Publication Data

US 2022/0206311 A1   Jun. 30, 2022

(30) Foreign Application Priority Data

Dec. 25, 2020   (CN) .......................... 202011562716.2

(51) Int. Cl.
*G02B 27/64*   (2006.01)
*G03B 5/00*   (2021.01)

(52) U.S. Cl.
CPC ............. *G02B 27/646* (2013.01); *G03B 5/00* (2013.01); *G03B 2205/0007* (2013.01)

(58) Field of Classification Search
CPC ................... G02B 27/646; G02B 7/02; G03B 2205/0007; G03B 2205/0069; G03B 30/00
See application file for complete search history.

(56) References Cited

U.S. PATENT DOCUMENTS

| | | | |
|---|---|---|---|
| 5,680,251 A * | 10/1997 | Kato | G02B 27/646 |
| | | | 359/557 |
| 6,203,207 B1 * | 3/2001 | Yamamoto | F16C 33/62 |
| | | | 384/909 |
| 2005/0140818 A1 | 6/2005 | Uemura et al. | |

(Continued)

FOREIGN PATENT DOCUMENTS

| CN | 1971327 | 5/2007 |
|---|---|---|
| CN | 202059482 | 11/2011 |

(Continued)

OTHER PUBLICATIONS

Notice of Reasons for Refusal Dated Jan. 10, 2023 From the Japan Patent Office Re. Application No. 2021-190233 and Its Translation Into English. (5 Pages).

(Continued)

*Primary Examiner* — Thomas K Pham
*Assistant Examiner* — Justin W. Hustoft

(57) ABSTRACT

A lens driving device, a camera device, and an electronic apparatus are provided in which variation is not liable to occur in a friction coefficient of a guide mechanism. A lens driving device 12 includes a guide mechanism 38 configured to guide movement of a lens. The guide mechanism 38 includes a first member formed with guide projections 44, 48 and a second member conned with guide grooves 46, 50 in which the guide projections slide. At least one out of the first member or the second member is configured from a resin composition resulting from mixing a liquid crystal polymer together with a fluororesin. A fluororesin layer is provided to (Continued)

at least one surface of the guide projections or the guide grooves formed to at least the first member or the second member configured from the resin composition.

15 Claims, 10 Drawing Sheets

(56) References Cited

U.S. PATENT DOCUMENTS

2007/0115566 A1  5/2007  Miyazawa et al.
2019/0121053 A1  4/2019  Hagiwara

FOREIGN PATENT DOCUMENTS

| | | |
|---|---|---|
| JP | 2000-303967 | 10/2000 |
| JP | 2003-262776 | 9/2003 |
| JP | 2004-335022 | 11/2004 |
| JP | 2005-195669 | 7/2005 |
| JP | 2015-089264 | 5/2015 |
| JP | 2017-116715 | 6/2017 |
| JP | 2019-78850 | 5/2019 |

OTHER PUBLICATIONS

Notification of Office Action and Search Report Dated Apr. 14, 2023 From the State Intellectual Property Office of the People's Republic of China Re. Application No. 202011562716.2 and Its Translation of Office Action Into English. (14 Pages).

* cited by examiner

LENS DRIVING DEVICE, CAMERA DEVICE, AND ELECTRONIC APPARATUS

CROSS-REFERENCES TO RELATED APPLICATIONS

This application claims priority to Chinese Patent Application No. 202011562716.2 filed on Dec. 25, 2020 and the entire contents of which are incorporated by reference herein.

TECHNICAL FELD

The present invention relates to a lens driving device, a camera device, and an electronic apparatus.

BACKGROUND ART

Electronic apparatuses such as mobile telephones, smartphones and the like are installed with small camera devices. Such small cameras may, for example, include image stabilization functionality such as that described in Japanese Patent Application Laid-Open (JP-A) No. 2019-78850.

SUMMARY

Japanese Patent Application Laid-Open (JP-A) No. 2019-78850 describes a guide mechanism provided to make a lens moveable. The guide mechanism is configured from a guide projection and a guide groove in which the guide projection slides.

However, an issue with the above guide mechanism is that at friction coefficient between the guide projection and the guide groove sometimes becomes high.

An object of the present invention is to provide a lens driving device, a camera device, and an electronic apparatus capable of resolving the issues described above in which a high friction coefficient of a guide mechanism is not liable to occur.

Solution to Problem

In a lens driving device of an aspect el the present invention, the lens driving device includes a guide mechanism configured to guide movement of a lens. The guide mechanism includes a first member formed with a guide projection and a second member formed with a guide groove in which the guide projection slides. At least one portion, from out of a portion of the first member where at least the guide projection is formed or a portion of the second member where at least the guide groove is formed, is configured from a resin composition resulting from mixing a liquid crystal polymer together with a fluororesin. A fluororesin layer is provided to a sliding portion of at least one out of the guide projection or the guide groove.

Moreover, a configuration may also be adopted in which a lens driving device includes a lens support body configured to support a lens, a frame configured to support the lens support body, and a guide mechanism provided to a specific member configuring the lens support body and the frame, and configured to guide the lens support body so as to be movable in a direction orthogonal to an optical axis direction of the lens with respect to a specific member. The guide mechanism includes a guide projection and a guide groove in which the guide projection slides. At least one portion, from out of a portion of the specific member and the lens support body where at least the guide projection is formed or a portion of the specific member and the lens support body where at least the guide groove is formed, is configured from a resin composition resulting from mixing a liquid crystal polymer together with a fluororesin. A fluororesin layer is provided to a sliding, portion of at least one out of the guide projection, or the guide groove.

Moreover, a configuration may also be adopted in which a lens driving device includes a lens support body configured to support a lens, and a guide mechanism to guide the leas support body in an optical axis direction. The lens support body is configured from a resin composition resulting from mixing a liquid crystal polymer together with a fluororesin. A fluororesin layer is provided to a sliding portion of a guide groove of the lens support body configuring the guide mechanism.

Preferably the fluororesin is polytetrafluoroethylene, and the fluororesin layer is a polytetrafluoroethylene layer.

Another aspect of the present invention is a camera device. The camera device includes the lens driving device, and a lens supported by the lens support body.

Another aspect of the present invention is an electronic apparatus. The electronic apparatus includes the camera device.

According to the present invention, a portion where at least a sliding portion is formed of a member that configures a guide mechanism to guide a lens support body in an optical axis direction or a direction orthogonal to the optical axis direction is configured from a resin composition resulting from mixing a liquid crystal polymer together with a fluororesin, and a fluororesin layer is provided to a sliding portion of the guide mechanism. A low friction coefficient is accordingly maintained by the fluororesin layer. This means that even were the fluororesin layer to become thin, for example with repeated use, and direct contact were to occur between members configuring the sliding portion, the fluororesin of the member configuring the sliding portion would appear at the surface of the sliding portion. This accordingly enables provision of a lens driving device, a camera device, and an electronic apparatus M which a high friction coefficient in a guide mechanism is not liable to occur.

DESCRIPTION OF EMBODIMENTS

Explanation follows regarding an exemplary embodiment of the present invention, with reference to the drawings. Note that although the following exemplary embodiment describes an example of a lens driving device, a camera device, and an electronic apparatus of the present invention, there is no intention that the present invention should be limited to the following exemplary embodiment.

Figure 1:
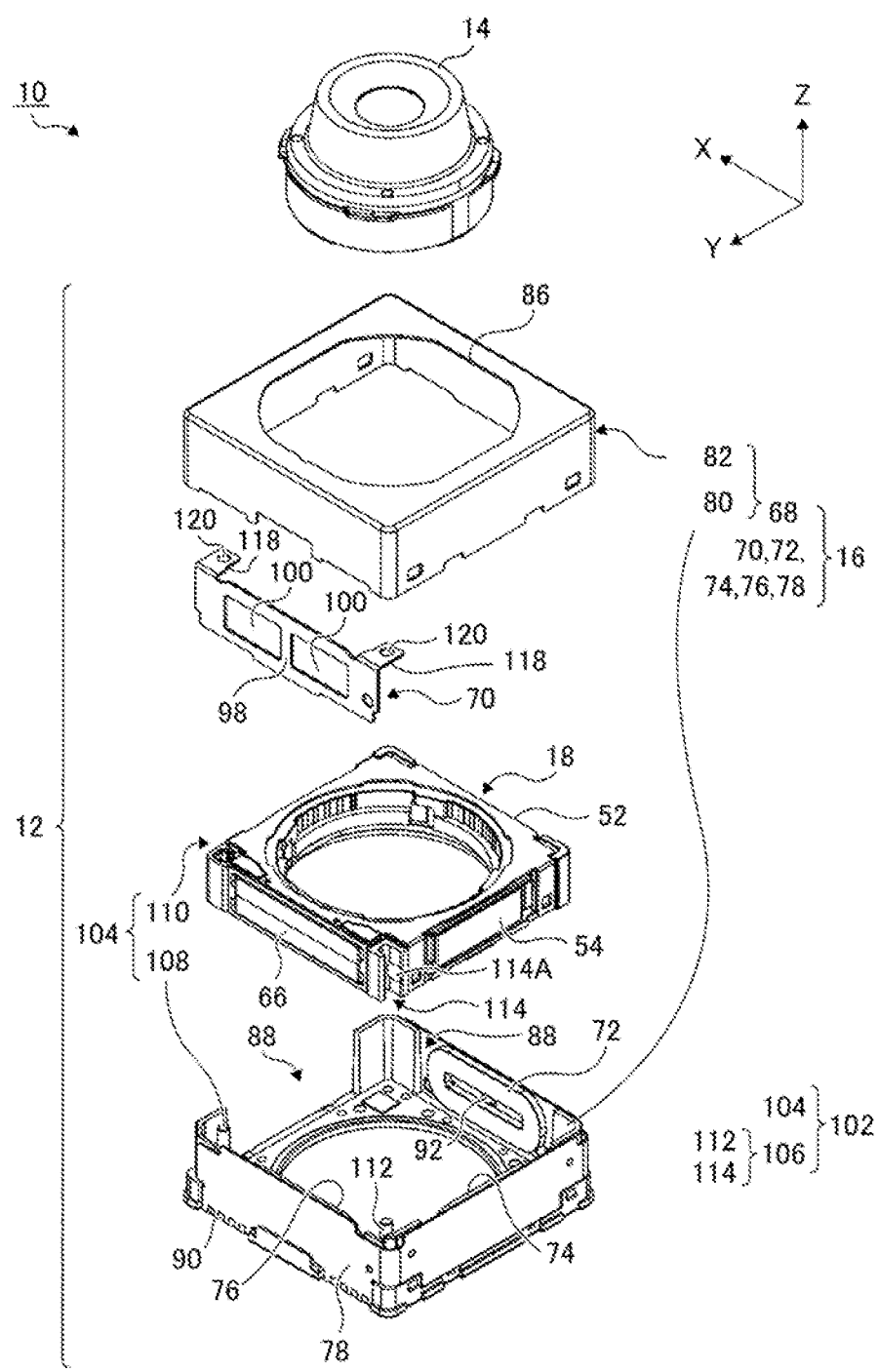
FIG. 1 is an exploded perspective view illustrating a camera device 10 of an exemplary embodiment of the present invention as viewed obliquely front above.

FIG. 1 illustrates a camera device 10 according to the present exemplary embodiment of the present invention. The camera device 10 is installed in an electronic apparatus such as a mobile telephone or a smartphone, and includes a lens driving device 12 and a lens 14 mounted to the lens driving device 12.

Note that in the following explanation, for ease of explanation an optical axis direction of the lens 14 is referred to as the Z direction, one direction orthogonal to the Z direction is referred to as the X direction, and a direction orthogonal to both the Z direction and the X direction is referred to as the direction. An imaging subject side on the optical axis (corresponding to the upper side in FIG. 1) is referred to as the upper side, and the opposite side thereto, this being the side on which a non-illustrated image sensor is disposed, is referred to as the lower side.

The lens driving device 12 includes a fixed body 16 and a movable body 18 supported by the fixed body 16 so as to be able to move in the optical axis direction. The movable body 18 is disposed within the fixed body 16.

Figure 2:
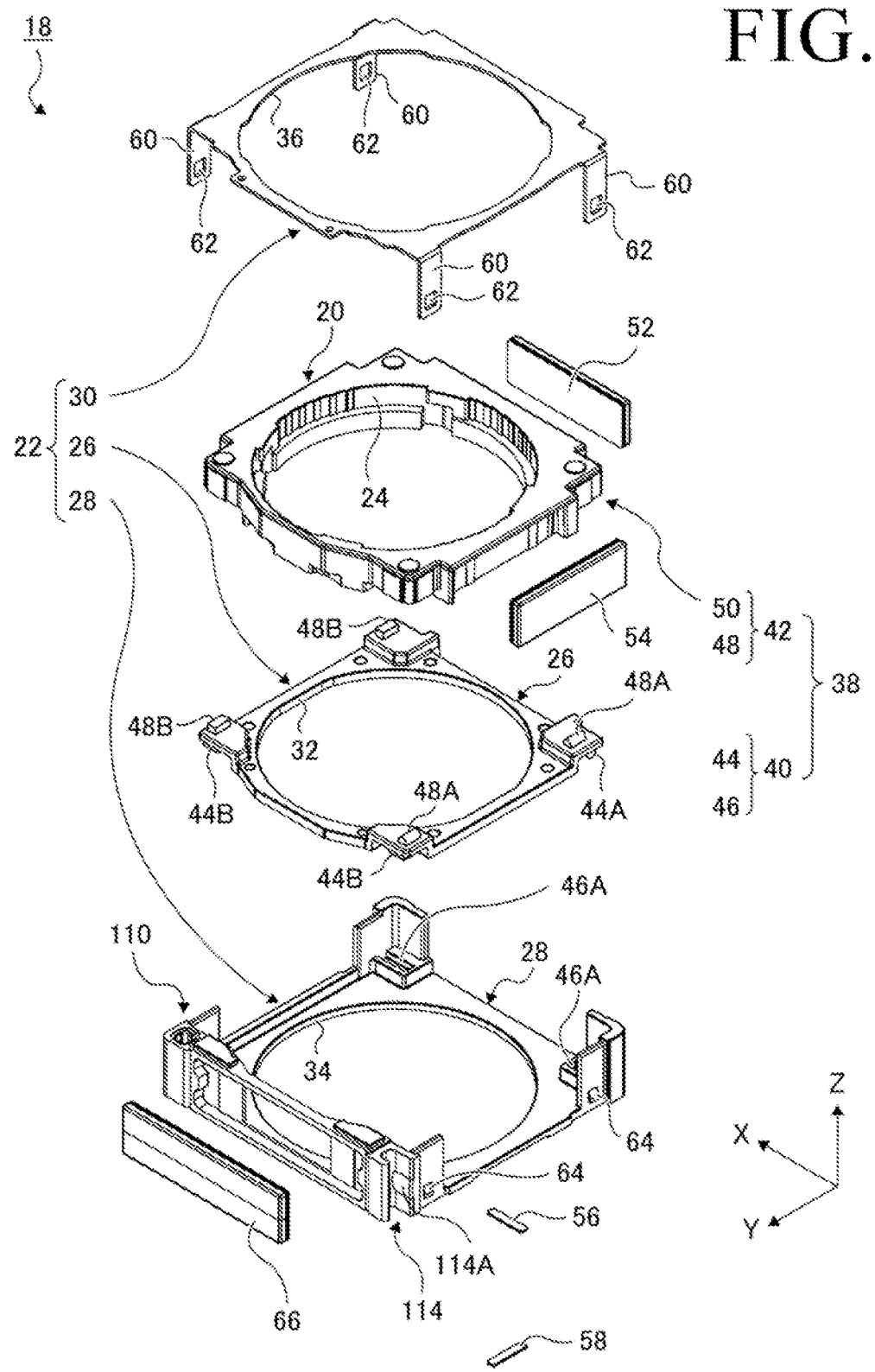
FIG. 2 is an exploded perspective view illustrating a movable body 18 configuring the camera device 10 in FIG. 1 as viewed obliquely from above.
Figure 3:
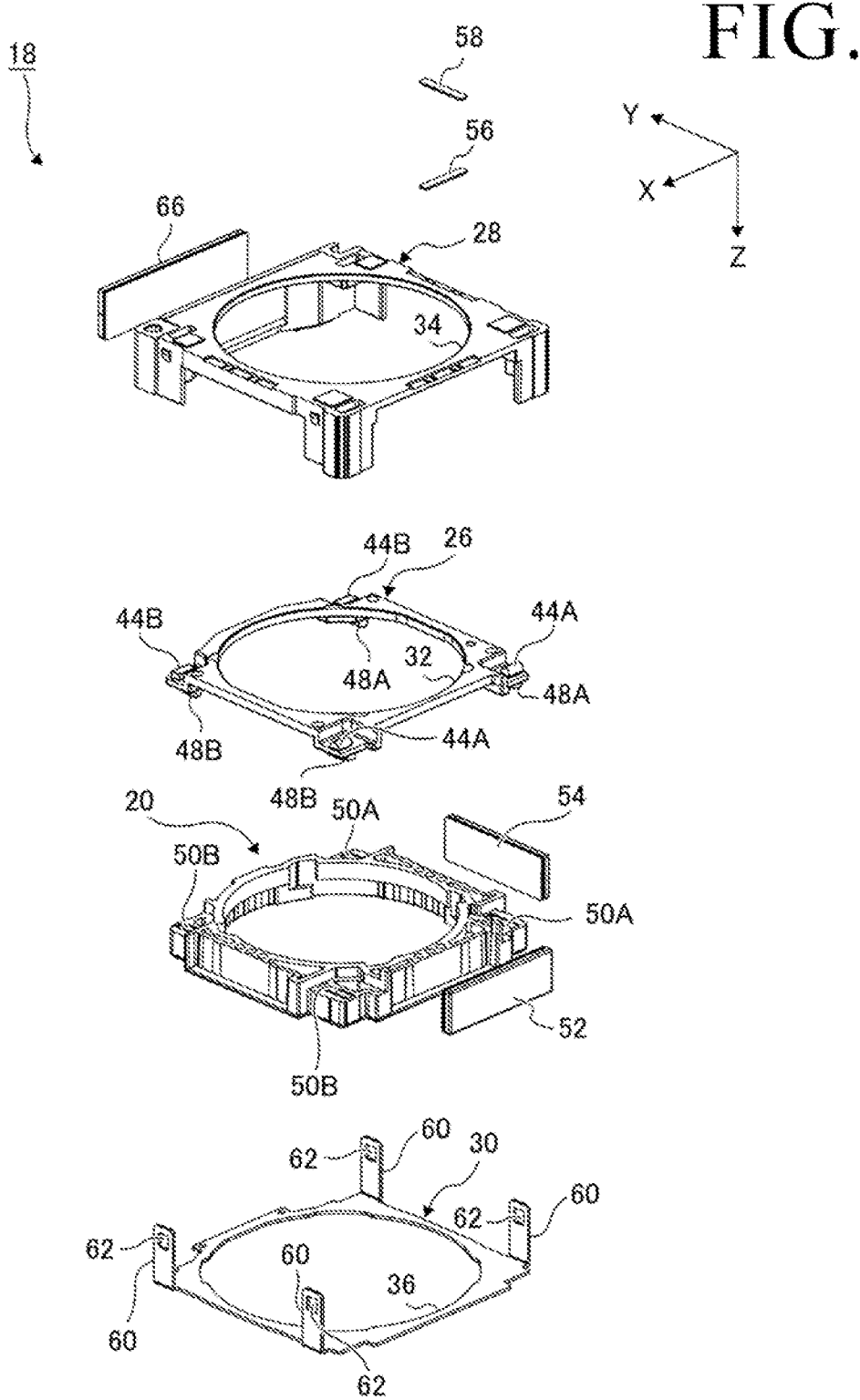
FIG. 3 is an exploded perspective view illustrating the movable body 18 in FIG. 2 as viewed obliquely from below.

As illustrated in FIG. 2 and FIG. 3, the movable body 18 includes a lens support body 20 to support the lens 14, and a first frame 22 configuring a frame that surrounds the periphery of the lens support body 20. The lens support body 20 and the first frame 22 each have a substantially square external profile as viewed from above.

A lens attachment hole 24 with a circular shape when viewed along the Z direction is formed penetrating through the inside of the lens support body 20 from the upper side to the lower side. The lens 14 is attached in the lens attachment hole 24.

The first frame 22 includes a first movable body plate 26, a second movable body plate 28, and a first cover 30, each of which has a substantially square external profile as viewed from above. The lens support body 20, the first movable body plate 26 and the second movable body plate 28 are configured from a resin composition resulting from mixing a liquid crystal polymer (LCP) together with a fluororesin. A known liquid crystal polymer may be widely employed therefor, and examples thereof include a liquid crystal polyester, a liquid crystal polycarbonate, a liquid crystal polyester-imide, and the like. More specific examples include an aromatic polyester, a polyester amide, a polyamide-imide, a polyester carbonate, a polyazomethine, and the like. A preferable liquid crystal polymer is an aromatic polyester. A known fluororesin may be widely employed therefor. For example, polytetrafluoroethylene (PTFE), a tetrafluoroethylene-hexafluoroethylene copolymer, a poly-trichlorofluoroethylene, a tetrafluoroethylene-perfluoroalkyl vinyl ether copolymer, or the like. A preferable fluororesin is polytetrafluoroethylene.

A fluororesin layer is formed between the lens support body 20, the first movable body plate 26, and the second movable body plate 28, by being provided to sliding portions of a first guide mechanism 40, a second guide mechanism 42, and an optical axis direction guide mechanism 102, described later. A preferable material for this fluororesin layer is polytetrafluoroethylene. The fluororesin layer is, for example, provided, by coating thereon.

The first cover 30 is formed, for example, from a metal. The first movable body plate 26, the second movable body plate 28, and the first cover 30 are respectively formed with openings 32, 34, 36 piercing through from the upper side to the lower side to let light pass through. The openings 32, 34, 36 each have a substantially circular shape.

The first frame 22 supports the leas support body 20 so as to allow the lens support body 20 to move in both the X direction, corresponding to a first direction, and the Y direction, corresponding to a second direction. Specifically, the lens support body 20 and the first frame 22 are provided with an orthogonal direction guide mechanism 38 configuring a guide mechanism, and support the lens support body 20 with respect to the second movable body plate 28, this being a specific member configuring a frame, such that the lens support body 20 is able to move in both the X direction and the direction. The orthogonal direction guide mechanism 38 is configured by a first guide mechanism 40 provided on one side (a lower side) in the Z direction, and a second guide mechanism 42 provided on the other side (an upper side) in the Z direction.

The first guide mechanism 40 is configured by lower side guide projections 44 formed projecting in a −Z direction from a lower face of the first movable body plate 26, and lover side guide grooves 46 formed recessed toward the −Z direction in an upper face of the second movable body plate 28 so as to allow the lower side guide projections to fit therein. A fluororesin layer is provided on the surfaces of the lower side guide projections 44 and the lower side guide grooves 46. The lower side guide projections 44 and the lower side guide grooves 46 are each formed extending along, the X direction in the vicinities of the four corners of the first movable body plate 26 and the second movable body plate 28.

Since the lower side guide projections 44 and the lower side guide grooves 46 each extend along the X direction, relative movement is possible in the X direction only, whereas movement in the Y direction is restricted. Accordingly, the first movable body plate 26 is able to move in the X direction only with respect to the second movable body plate 28, and is restricted from moving in the Y direction. Namely, the first guide mechanism 40 enables the lens support body 20 to move together with the first movable body plate 26 in the X direction with respect to the second movable body plate 28.

The lower side guide projections 44 and the lower side guide grooves 46 are disposed on one side and the other side in the Y direction, this being a direction orthogonal to the movement direction of the first movable body plate 26. Specifically, the lower side guide projections 44 include two lower side guide projections 44A, 44A provided on the one side in the Y direction (a −Y side), and two lower side guide projections 44B, 44B provided on the other side in the direction (a +Y side). The lower side guide grooves 46 include two lower side guide grooves 46A, 46A provided on the one side in the Y direction, and two lower side guide grooves 46B, 46B provided on the other side in the Y direction.

Figure 7A:
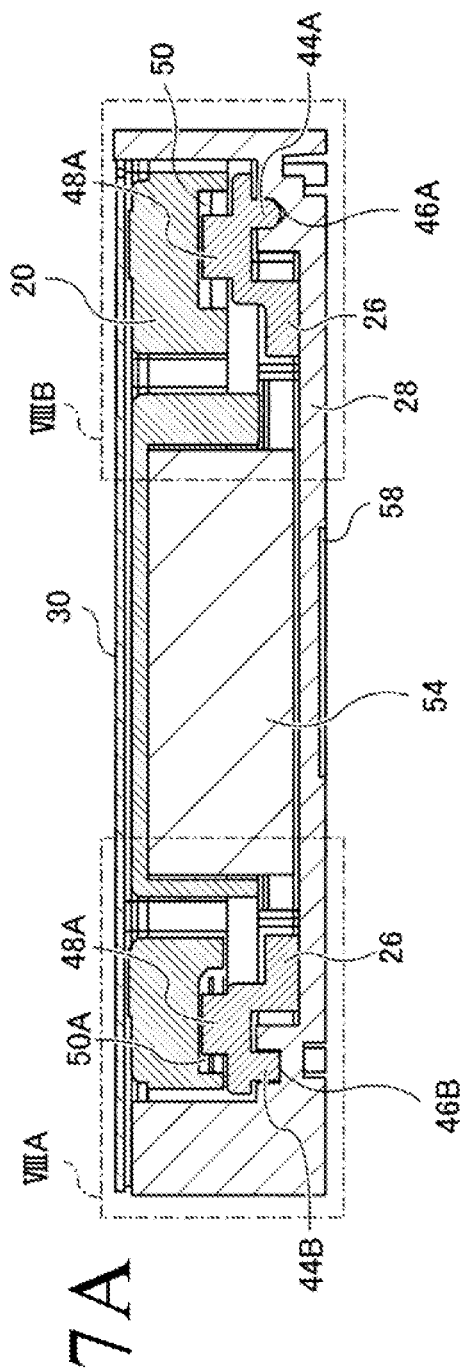
FIG. 7A is a cross-section as sectioned along line VIIA-VIIA in FIG. 6.
Figure 8A:
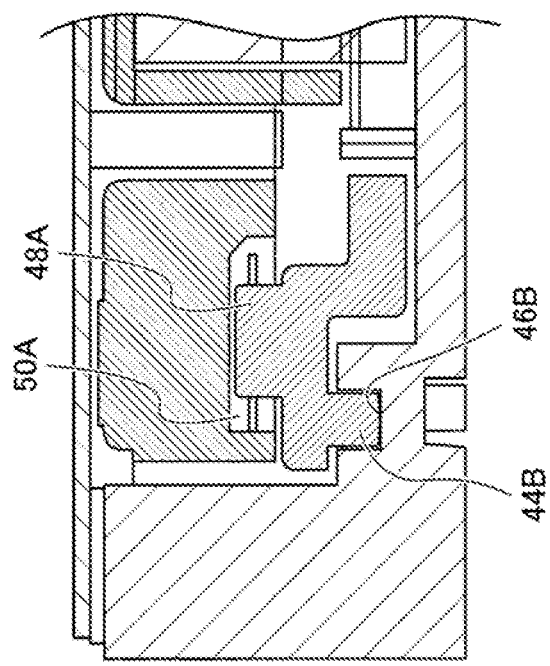
FIG. 8A is an enlarged cross-section of the portion VIIIA in FIG. 7A.
Figure 8B:
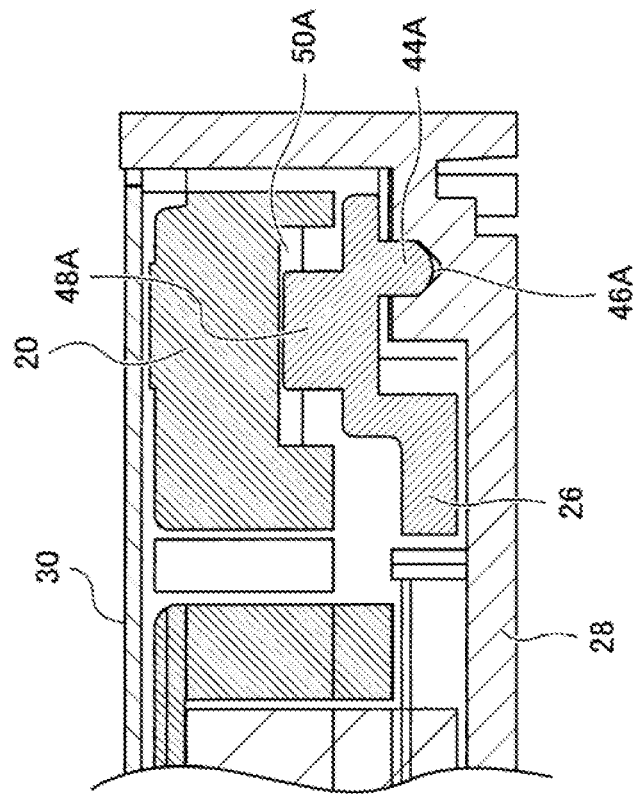
FIG. 8B is an enlarged cross-section of the portion VIIIB in FIG. 7A.

As illustrated in FIG. 7A and FIG. 8B, as viewed along the X direction, the lower side guide grooves 46A, 46A on the one side in the direction each have a V-shaped profile inclined so as to narrow in width on progression toward the groove bottoms with the widths of the lower side guide grooves 46A, 46A decreasing on progression toward their groove bottoms. The lower side guide projections 44A, 44A each have a semicircular profile. Accordingly, arc shaped portions of the lower side guide projections 44A, 44A and linear portions of the lower side guide grooves 46A, 46A make line contact with one another at two locations each. A space is formed between the lower side guide grooves 46A, 46A and the corresponding lower side guide projections 44A, 44A in a region between the positions of the two locations of line contact and the corresponding groove bottom. The lower side guide projections 44A, 44A may each have a rectangular cross-section profile, in which case the lower side guide grooves 46A, 46A may each have either a V-shaped or a U-shaped cross-section profile. By making, line contact at two locations, the V direction positions of the lower side guide projections 44A, 44A are precisely defined with respect to the lower side guide grooves 46A, 46A.

As illustrated in FIG. 7A and FIG. 8A, as viewed along the X direction, the lower side guide projections 44B, 44B and the lower side guide grooves 46B, 46B on the other side in the V direction each have a rectangular profile. Namely, groove bottoms of the lower side guide grooves 46B, 46B include planar faces extending in a direction orthogonal to the direction in which the lower side guide projections 44B, 44B and the lower side guide grooves 46B, 46B extend, and the lower side guide projections 44B, 44B includes planar faces that make face-to-face contact with these planar faces. Accordingly, the lower side guide projections 44B, 44B and the lower side guide grooves 46B, 46B on the other side in the Y direction make face-to-face contact with each other. This enables the Z direction height of the first movable body plate 26 to be defined with respect to the second movable body plate 28. The planar faces of the lower side guide grooves 46B, 46B are wider than the lower side guide projections 44B, 44B. Accordingly, assembly is still possible even if tolerances during manufacturing result in a difference between the distance between the lower side guide projections 44A, 44A and the lower side guide projections 44B, 44B and the distance between the lower side guide grooves 46A, 46A and the lower side guide grooves 46B, 46B, enabling the first movable body plate 26 to still move smoothly.

The second guide mechanism 42 is configured from upper side guide projections 48 formed projecting in a direction from an upper face of the first movable body plate 26, and upper side guide grooves 50 formed recessed toward the +Z direction in a lower face of the lens support body 20 so as to allow the upper side guide protections 48 to fit therein. A fluororesin layer is provided on surfaces of the lower side guide projections 44 and the lower side guide grooves 46. The upper side guide projections 48 and the upper side guide grooves 50 are formed so as to extend along the Y direction in the vicinities of the four corners of the First movable body plate 26 and the lens support body 20.

Since the upper side guide projections 48 and the upper side guide grooves 50 extend along the direction, relative movement is permitted in the direction only, and movement in the X direction is restricted. Accordingly, the lens support body 20 is able to move in the Y direction only with respect to the first movable body plate 26, and is restricted from moving in the X direction. Namely, the second guide mechanism 42 enables the lens support body 20 to move in the Y direction with respect to the first movable body plate 26. The lens support body 20 is accordingly able to move in both the X direction and the direction with respect to the second movable body plate 28. Moreover, the first guide mechanism 40 and the second guide mechanism 42 configure independent guide mechanisms, and force is not applied in a rotation direction about the Z direction even if drive is performed simultaneously in the X and Y directions, thereby enabling the lens support body 20 to be prevented from oscillating in the rotation direction.

The upper side guide projections 48 and the upper side guide grooves 50 are disposed on one side and the other side in the X direction, this being a direction orthogonal to the movement direction of the lens support body 20. Specifically, the upper side guide projections 48 include two upper side guide projections 48A, 48A provided on the one side in the X direction (a −X side), and two upper side guide projections 48B, 48B provided on the other side in the X direction (a +X side). The upper side guide grooves 50 include two upper side guide grooves 50A 50A provided on the one side in the X direction, and two upper side guide grooves 50B, 50B provided on the other side in the X direction.

Figure 7B:
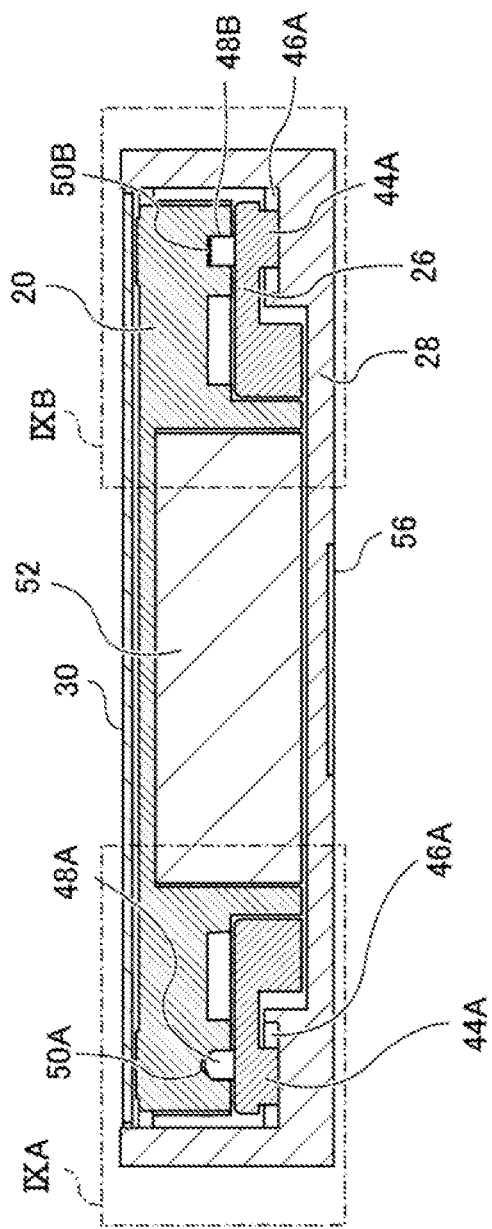
FIG. 7B is a cross-section as sectioned along line VIIB-VIIB in FIG. 6.
Figure 9A:
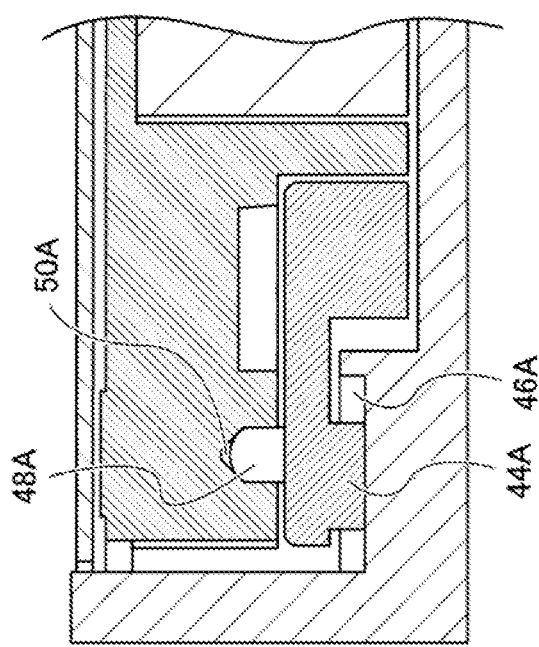
FIG. 9A is an enlarged cross-section of the portion IXA in FIG. 7

As illustrated in FIG. 7B and FIG. 9A, as viewed along the Y direction, the upper side guide grooves 50A, 50A on the one side in the X direction each have a V-shaped profile inclined so as to narrow in width on progression toward the groove bottoms with the widths of the upper side guide grooves 50A, 50A decreasing on progression toward their groove bottoms. The upper side guide projections 48A, 48A each have a semicircular profile. Accordingly, arc shaped portions of the upper side guide projections 48A, 48A and linear portions of the upper side guide grooves 50A, 50A make line contact with one another at two locations each. A space is formed between the upper side guide projections 48A, 48A and the corresponding upper side guide grooves 50A, 50A in a region between the positions of the two locations of line contact and the corresponding groove bottom. The upper side guide projections 48A, 48A may each have a rectangular cross-section profile, in which case the upper side guide grooves 50A, 50A may each have either a V-shaped or a U-shaped cross-section profile. By making line contact at two locations each, the X direction positions of the upper side guide grooves 50A, 50A are precisely defined with respect to the upper side guide projections 48A, 48A.

Figure 9B:
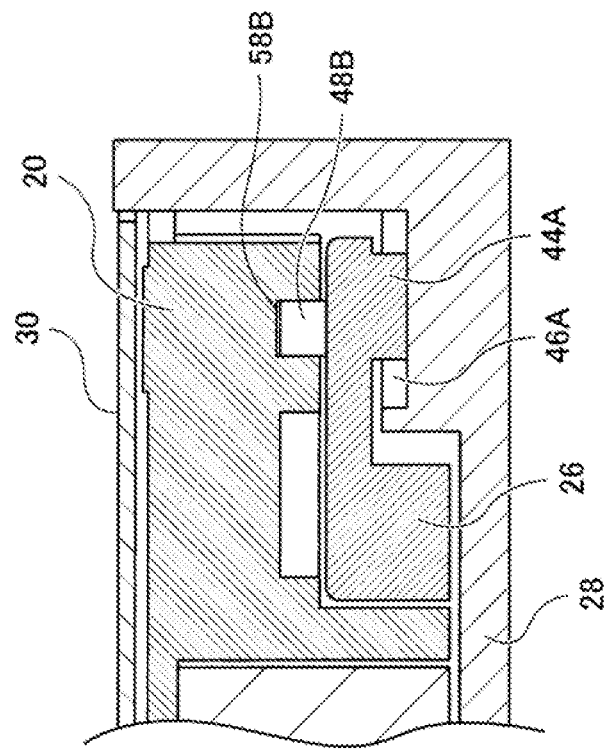
FIG. 9B is an enlarged cross-section of the portion IXB in FIG. 7B.

As illustrated in FIG. 7B and FIG. 9B, as viewed along the direction, the upper side guide projections 48B, 48B and the upper side guide grooves 50B, 50B on the other side in the X direction each have a rectangular profile. Namely, groove bottoms of the upper side guide grooves 50B, 50B include planar faces extending in a direction orthogonal to the direction in which the upper side guide projections 48B, 48B and the upper side guide grooves 50B, 50B extend, and the upper side guide projections 48B, 48B include planar faces that make face-to-face contact with these planar faces. Accordingly, the upper side guide projections 48B, 48B and the upper side guide grooves 50B, 50B that are on the other side in the X direction make face-to-face contact with each other. This enables the Z direction height of the lens support body 20 to be defined with respect to the first movable body plate 26. The planar faces of the upper side guide grooves 50B, 50B are wider than the upper side guide projections 48B, 48B. Accordingly, assembly is still possible even if tolerances during manufacturing results a difference between the distance between the upper side guide projections 48A, 48A and the upper side guide projections 48B, 48B and the distance between the upper side guide grooves 50A, 50A and the upper side guide grooves 50B, 50B, enabling the lens support body 20 to move smoothly.

A plate shaped first magnet 52 and a plate shaped second magnet 54 are fixed to outer sides of the lens support body 20. The first magnet 52 is disposed with its plate faces facing along the Y direction on the one side in the Y direction, this being the side where the lower side guide projections 44A, 44A and the lower side guide grooves 46A, 46A make line contact with each other. The second magnet 54 is disposed with its Plate faces facing along the X direction on the one side in the X direction, this being the side where the upper side guide projections 48A, 48A and the upper side guide grooves 50A, 50A make line contact with each other. The S pole of the first magnet 52 is provided on one of the Plate faces facing in the Y direction, and the N pole is provided on the other of these plate faces. The S pole of the second magnet 54 is provided on one of the plate faces facing in the X direction, and the N pole is provided on the other of these plate faces.

A first magnetic member 56 and a second magnetic member 58, each configured by a magnetic body, are disposed at a lower thee of the second movable body plate 28. The first magnetic member 56 is disposed on the one side in the Y direction so as to run along the X direction parallel to the first magnet 52. The second magnetic member 58 is disposed on the one side in the X direction so as to run along the V direction parallel to the second magnet 54. Accordingly, the first magnetic member 56 opposes the first magnet 52 in the Z direction across the second movable body plate 28, and similarly the second magnetic member 58 opposes the second magnet 54 in the Z direction across the second movable body plate 28.

The first magnet 52 and the first magnetic member 56 on the one side in the Y direction are disposed between a set of one of the lower side guide projections 44A and one of the lower side guide grooves 46A and a set of the other of the lower side guide projections 44A and the other of the lower side guide grooves 46A, and attract one another. The lower side guide projections 44A, 44A and the lower side guide grooves 46A, 46A that are in line contact with one another accordingly make firmer contact with one another than they would were the first magnet 52 and the first magnetic member 56 to be disposed at other positions, enabling more precise positioning to be performed in the Y direction.

The second magnet 54 and the second magnetic member 58 on the one side in the X direction are disposed between a set of one of the upper side guide projections 48A and one of the tipper side guide grooves 50A and a set of the other of the tipper side guide projections 48A and the other of the upper side guide grooves 50A, and attract one another. The upper side guide grooves 50A, 50A and the upper side guide projections 48A, 48A that are in line contact with one another accordingly make firmer contact with one another than they would were the second magnet 54 and the second magnetic member 58 to be disposed at other positions, enabling more precise positioning to be performed in the X direction.

Attachment portions 60 are provided extending downward in the Z direction at the four corners of the first cover 30. Each of the attachment portions 60 is formed with a square attachment hole 62. Counterpart attachment portions 64 are formed protruding sideways at the four corners of the second movable body plate 28. The counterpart attachment portions 64 fit into the respective attachment holes 62 so as to fix the first cover 30 to the second movable body plate 28. Note that as illustrated in FIG. 7A and FIG. 7B, a minimum required gap to allow for error arising due to tolerance or the like is present between a lower face of the first cover 30 and an upper face of the lens support body 20. The lens support body 20, the first movable body plate 26, and the second movable body plate 28 are thus restricted from moving excessively away from one another even when subjected to shock.

A plate shaped third magnet 66 is fixed to an outer face on the side of the second movable body plate 28, this being the opposite side to the side where the first magnet 52 is provided. Plate faces of the third magnet 66 face in the Y direction. The third magnet 66 is divided into two parts, namely a Z direction upper side part and a Z direction lower side part. The S pole and the N pole are provided at the plate faces of the third magnet 66 and are disposed such that their polarities are opposite above and below.

As illustrated in FIG. 1, the fixed body 16 includes a second frame 68 provided with a base 80 and a second cover 82, a third magnetic member 70 attached to the second frame 68, a first coil 72, a second coil 74, a third coil 76, and a flexible printed substrate 78. The base 80 and the second cover 82 are each configured from a resin or a non-magnetic metal, and each have a square profile as viewed along the Z direction from above. The second cover 82 is fitted over the outside of the base 80 in order to configure the second frame 68. The second frame 68 surrounds the periphery of the first frame 22 of the movable body 18. The base 80 and the second cover 82 are formed with respective through holes 84, 86 to allow light to pass or to allow insertion of the lens 14.

Figure 4:
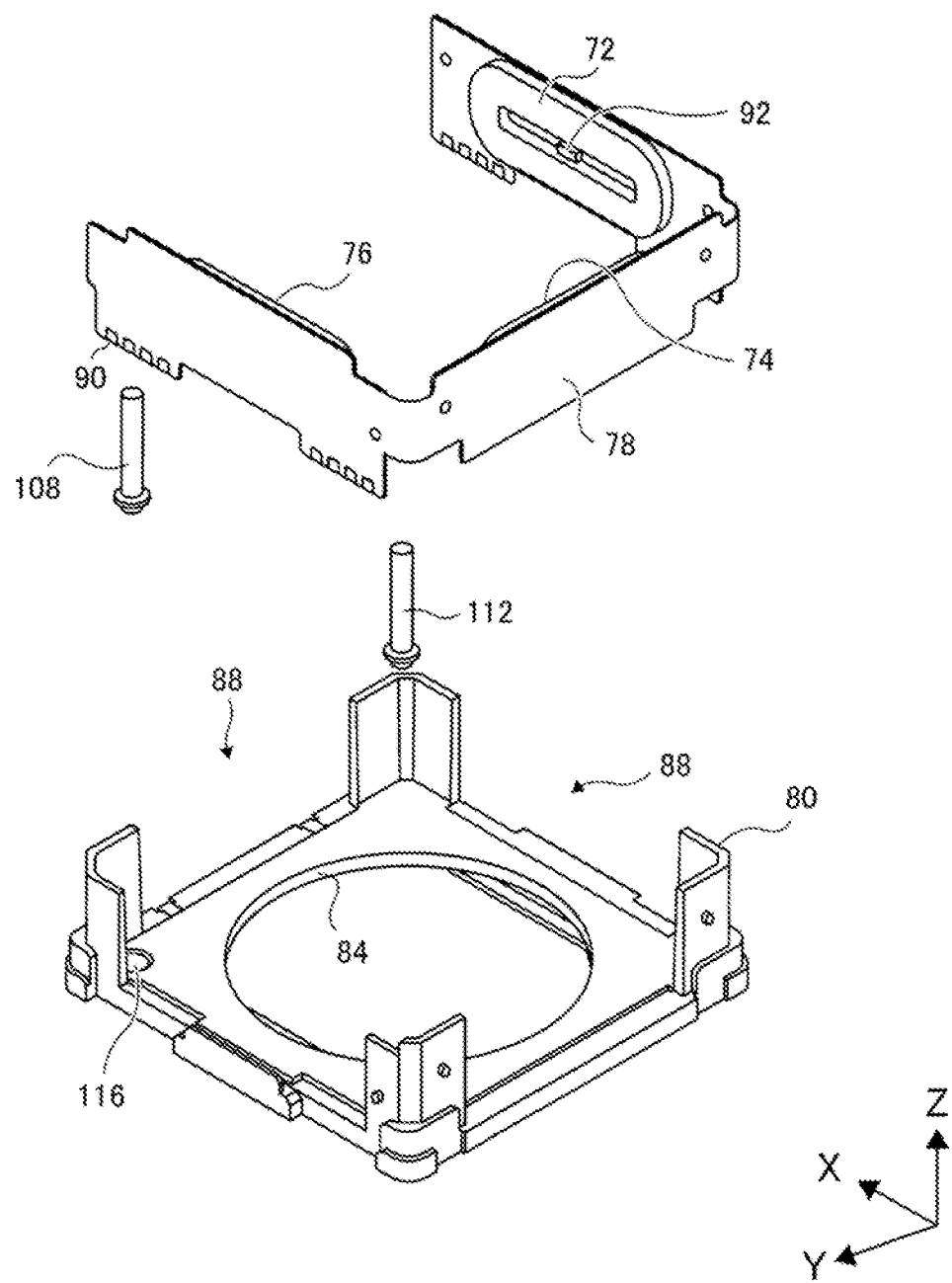
FIG. 4 is an exploded perspective view illustrating part of a fixed body 16 employed in the camera device 10 of an exemplary embodiment of the present invention, as viewed obliquely from above.

As illustrated in FIG. 1 and FIG. 4, openings 88 that are open toward the Z direction upper side are respectively formed in the four side faces of the base 80. The above-mentioned flexible printed substrate 78 is disposed so as to surround three of the side faces of the base 80. Namely, the flexible printed substrate 78 is folded in an angular C shape so as to enclose the two side faces of the base 80 that run orthogonally to the Y direction and one of the side faces (the side face on the −X side) of the base 80 that runs orthogonally to the X direction.

The first coil 72 and the third coil 76 are fixed at the inside of the flexible printed substrate 78 to the two faces that run orthogonally to the Y direction, and the second coil 74 is fixed to the one face that runs orthogonally to the X direction. A Z direction lower portion of the flexible printed substrate 78 is provided with terminals 90, and current supply, signal output, and the like are performed through the terminals 90.

Figure 5:
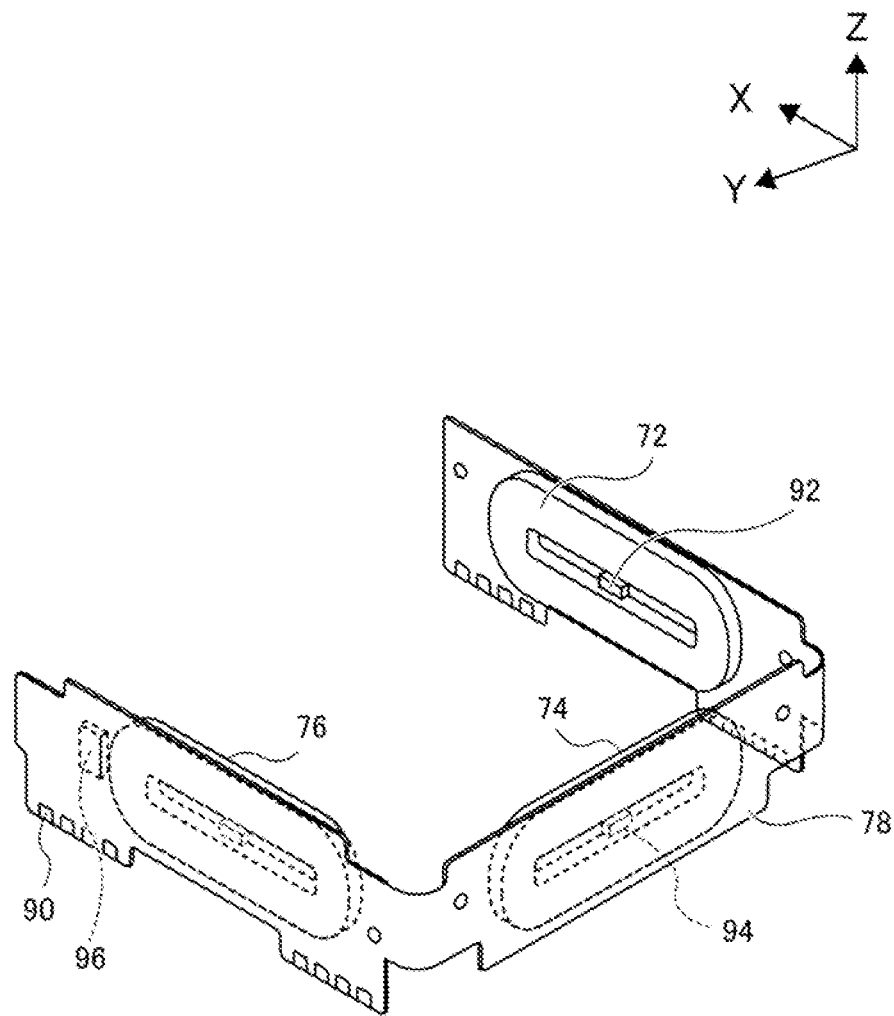
FIG. 5 is a perspective view illustrating a flexible printed substrate 78 to be attached to the fixed body 16 in FIG. 4.

As illustrated in FIG. 5, a Y direction position detection element 92 is disposed at the inside of the flexible printed substrate 78 at a center side of the first coil 72, an X direction position detection element 94 is disposed at a center side of the second coil 74, and a Z direction position detection element 96 is disposed at a position adjacent to the third coil 76.

The first coil 72 and the Y direction position detection element 92 are disposed inside the corresponding opening 88 so as face toward the inside of the base 80 and oppose the first magnet 52. Similarly, the second coil 74 and the X direction position detection element 94 are disposed inside the corresponding opening 88 so as to oppose the second magnet 54. The third coil 76 and the Z direction position detection element 96 are disposed inside the corresponding opening 88 so as to oppose the third magnet 66.

As illustrated in FIG. 1, the third magnetic member 70 that is configured by a magnetic body is disposed at the outer side of a portion of the flexible printed substrate 78 to which the third coil 76 is fixed so as to be parallel to the third coil 76. The third magnetic member 70 is fixed so as to be placed in close contact with a side face of the base 80 with the flexible printed substrate 78 interposed therebetween. The third magnetic member 70 thereby opposes the third magnet 66 across the flexible printed substrate 78 and the third coil 76.

Magnetic flux from the third magnet 66 flows in the third magnetic member 70, causing an attraction force to arise between the third magnet 66 and the third magnetic member 70. An attraction force accordingly acts on the movable body 18 in the Y direction with respect to the fixed body 16.

The third magnetic member 70 is formed with two divided openings 100, 100 that are divided into two parts in the X direction by a coupling portion 98 extending along the Z direction. The coupling portion 98 may extend along the X direction, in which case the divided openings 100, 100 would be divided into two parts in the Z direction. The third magnetic member 70 is formed from magnetic stainless steel or plated iron. By forming the third magnetic member 70 with the divided openings 100, 100, the attraction force between the third magnet 66 and the third magnetic member 70 can be adjusted to a desired strength. Namely, the attraction force between the third magnet 66 and the third magnetic member 70 can be set so as to be comparatively weak in comparison to a Z direction drive force between the third coil 76 and the third magnet 66. This enables the drive force required for Z direction movement to be made smaller, and also enables the damage imparted to an optical axis direction guide mechanism 102, described later, when subjected to external shock, to be reduced.

As illustrated in FIG. 1, the movable body 18 is supported by the optical axis direction guide mechanism 102 so as to be able to move in the Z direction with respect to the fixed body 16. Namely, the optical axis direction guide mechanism 102 guides the first frame 22 so as to allow the first frame 22 to move along the Z axis direction with respect to the second frame 68. Namely, the lens support body 20 is thereby guided so as to be able to move along the optical axis direction together with the first frame 22. The optical axis direction guide mechanism 102 is configured b a third guide mechanism 104 and a fourth guide mechanism 106. The third guide mechanism 104 is configured by a +X side guide shaft 108 provided to the second frame 68 and a +X side guide bole 110 provided to the movable body 18 so as to house the +X side guide shaft 108. A fluororesin layer is provided on the inside faces of the +X side guide hole 110. The fourth guide mechanism 106 is configured by a −X side guide shaft 112 provided to the second frame 68 and a −X side guide groove 114 provided to the movable body 18. A fluororesin layer is provided on the inside faces of the −X side guide groove 114.

In the present exemplary embodiment, the +X side guide shaft 108 and the −X side guide shaft 112 are each formed as circular columns extending along the Z direction, and are for example formed from a ceramic, a metal, or a resin. The +X side guide shaft 108 and the −X side guide shaft 112 are each disposed in the vicinity of an inside corner of the side face of the base 80 where the third coil 76 is disposed. Note that although the +X side guide shaft 108 and the −X side guide shaft 112 each have a circular profile in a cross-section sectioned along the X-Y direction plane, this circular profile may be provided locally, or an elliptical profile may be adopted. A polygonal profile such as a square profile may also be adopted.

Lower side fixing portions 116, 116 are provided to a bottom face the periphery of the through hole 84 in the base 80 at the vicinity of the corners of the side lace where the third coil 76 is disposed. Each of the lower side fixing portions 116, 116 has a cylindrical shape and is formed with an insertion groove. Lower ends of the +X side guide shaft 108 and the −X side guide shaft 112 are inserted into the respective lower side fixing portions 116, 116 and fixed thereto. Both X direction ends of an upper end of the third magnetic member 70 described above are formed with upper side fixing portions 118, 118 that are folded in the Y direction. An insertion hole 120 is formed through each of the upper side fixing portions 118. Upper ends of the +X side guide shaft 108 and the −X side guide shaft 112 are inserted into the respective insertion holes 120, 120 and fixed thereto. The +X side guide shaft 108 and the −X side guide shaft 112 are thus fixed to the base 80. The third magnetic member 70 thereby performs an additional function of supporting the +X side guide shaft 108 and the −X side guide shaft 112, enabling the number of components to be reduced in comparison to cases in which this support function is performed by a separate component, and enabling the +X side guide shaft 108 and the −X side guide shaft 112 to be stably supported.

Figure 6:
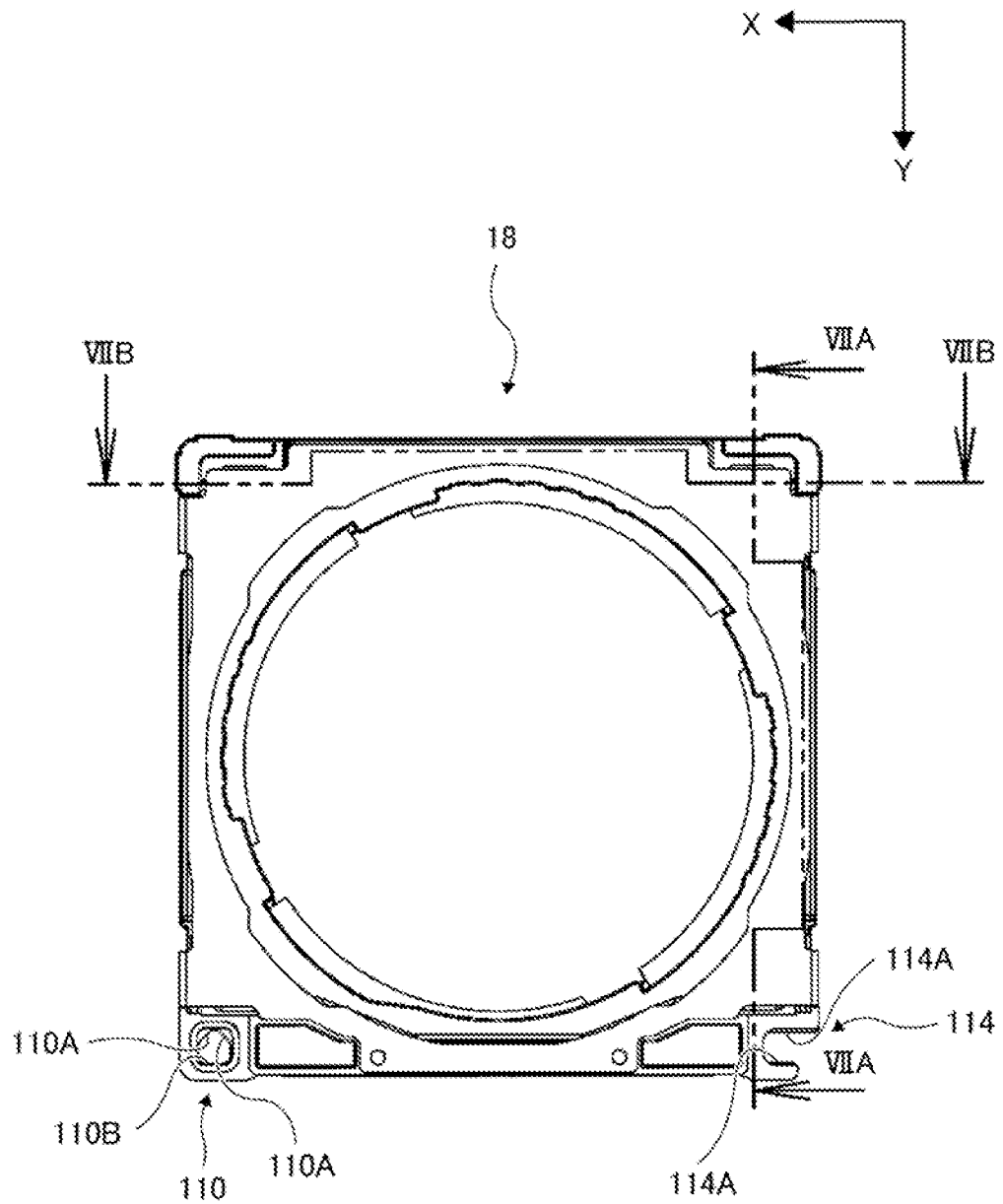
FIG. 6 is a plan view illustrating, the movable body 18 in FIG. 2 as viewed from above.

As illustrated in FIG. 2 and FIG. 6, the +X side guide hole 110 is formed as a hollow through hole penetrating the second movable body plate 28 from a Z direction upper Face to a Z direction lower face thereof. On the other hand, the −X side guide groove 114 extends so as to penetrate the second movable body plate 28 from the Z direction upper face to the Z direction lower lace, and is formed as a groove opening toward the exterior in the −X direction.

Figure 10:
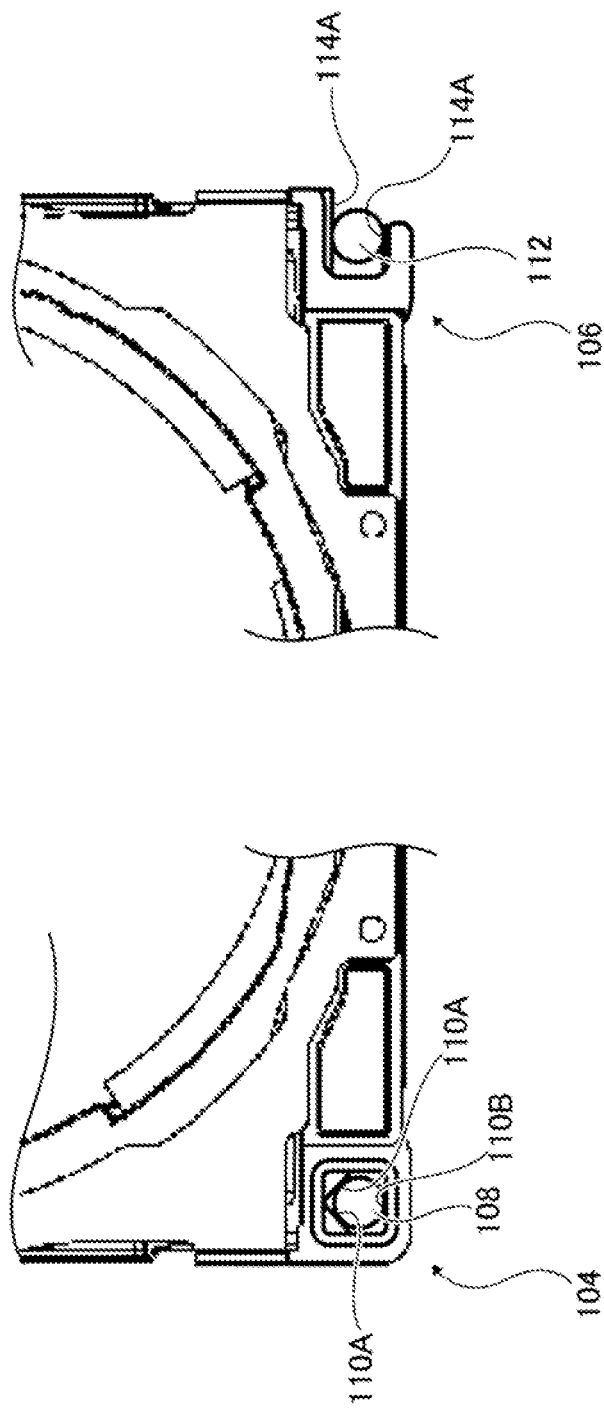
FIG. 10 is an enlarged plan view illustrating an optical axis direction guide mechanism 102 of the present exemplary embodiment as viewed from above.

As illustrated in FIG. 6 and FIG. 10, in cross-section viewed along an X-Y plane, the −Y side of the +X side guide hole 110 has a V-shaped profile opening toward the +Y side, this being the fixed body side, and the +Y side of the +X side guide hole 110 has a rectangular profile. Note that the +Y side may have a semicircular cross-section profile.

The attraction force between the third magnet 66 attached to the movable body 18 and the third magnetic member 70 draws the movable body 18 in the +Y direction. Accordingly, at least guide faces 110A, 110A forming the V-shaped profile on the −Y side of the +X side guide hole 110 make line contact with an outer surface of the +X side guide shaft 108 at two locations as viewed along the Z direction. This enables the movable body 18 to be positioned accurately with respect to the fixed body 16 in both the X direction and the Y direction. Note that although it is desirable for the rectangular portion of the +X side guide hole 110 to be provided with a minute gap to the outer surface of the +X side guide shaft 108 such that the two do not make line contact with each other, line contact is also acceptable therebetween.

In an X-Y plane cross-section, the −X side guide groove 114 is configured b two wall faces opposing each other in the Y direction. These two wall faces are respectively formed with protrusions 114A, 114A, each with a curved face profile protruding in the Y direction. A fluororesin layer may be provided on just the surfaces of the protrusions 114A. As illustrated in FIG. 10, the center of at least the protrusion 114A on the −Y side contacts an outer surface of the −X side guide shaft 112. Namely, the −X side guide groove 114 and the −X side guide shall 112 make point contact with each other at least at one point, such that frictional resistance therebetween is lower. Note that although it is desirable for the protrusion 114A on the +Y side to be provided with a minute gap to the outer surface of the −X side guide shaft 112 such that the two do not make point contact, line contact is also acceptable therebetween. In this manner, the movable body 18 is pressed by magnetic force against the +X side guide shaft 108 and the −X side guide shaft 112, and so the movable body 18 does not tilt with respect to the +X side guide shaft 108 and the −X side guide shaft 112. Note that an increase in the size of the lens 14 leads to an increase in the weight of the movable body 18 installed with the lens 14. In such cases, there has hitherto been a need to increase the required attraction force from this magnetic force, with the result that frictional force increases and drive force has had to be increased by at least an amount commensurate with the increase in the weight of the lens. However, in the present exemplary embodiment, employing the guide shaft structure obviates the need to increase the required attraction force using magnetic force, enabling the drive force to be kept small.

In the lens driving device 12, the first magnet 52 and the first coil 72 configure a drive mechanism to move the lens support body 20 along the axis direction with respect to the second movable body plate 28. When the first coil 72 is supplied with an electricity, a current flows in the X direction in the first coil 72. Since the first magnet 52 opposing the first coil 72 generates magnetic flux with a Z direction component, a Lorentz force acts on the first coil 72 in the Y direction. Since the first coil 72 is fixed to the base 80, a reaction acting on the first magnet 52 acts as a drive force on the lens support body 20. The lens support body 20 accordingly moves in the Y direction, guided by the second guide mechanism 42.

In the second guide mechanism 42, the upper side guide projections 48 and the upper side guide grooves 50 slide against each other. A fluororesin layer is provided on the respective sliding portions of the upper side guide projections 48 and the upper side guide grooves 50, and so a low friction coefficient is maintained, and they slide smoothly against each other. At the start of operating the lens driving device 12, the upper side guide projections 48 and the upper side guide grooves 50 slide against each other with the fluororesin layers interposed therebetween. However, with time the fluororesin layer is thinned by repeated use of the lens driving device 12, and sometimes direct contact occurs between members configuring the upper side guide projections 48 and the upper side guide grooves 50. However, the lens support body 20 and the first movable body plate 26 configuring the second guide mechanism 42 are configured from a resin composition resulting from mixing a liquid crystal polymer together with a fluororesin. This means that fluororesin would appear at the surface even if the fluororesin layer on the surface were to disappear, enabling a high friction coefficient to be avoided.

After the lens support body 20 has moved in the direction, a current supply to the first coil 72 is turned off. When this is performed, the lens support body 20 stops at its position of the current supply to the first coil 72 being turned off due to the attraction force between the first magnet 52 and the first magnetic member 56, the attraction force between the second magnet 54 and the second magnetic member 58, friction between the lower side guide projections 44 and the lower side guide grooves 46, and friction between the upper side guide projections 48 and the upper side guide grooves 50.

Moreover, the second magnet 54 and the second coil 74 configure a drive mechanism to move the lens support body 20 together with the first movable body plate 26 along the X axis direction with respect to the second movable body plate 28. When the second coil 74 is supplied with an electricity, a current flows in the Y direction in the second coil 74. Since the second magnet 54 opposing the second coil 74 generates magnetic flux having a Z direction component, a Lorentz force acts on the second coil 74 in the X direction. Since the second coil 74 is fixed to the base 80, a repulsion effect acting on the second magnet 54 acts as a drive force on the lens support body 20 and the first movable body plate 26. The lens support body 20 and the first movable body plate 26 accordingly move in the X direction, guided by the first guide mechanism 40.

In the first guide mechanism 40, the lower side guide projections 44 and the lower side guide grooves 46 slide against each other. A fluororesin layer is provided to respective sliding portions on the lower side guide projections 44 and the lower side guide grooves 46, a low friction coefficient is accordingly maintained, and they slide smoothly against each other. At the start of operating the lens driving device 12, the lower side guide projections 44 and the lower side guide grooves 46 slide against each other with the fluuroresin layer interposed therebetween. However, with time the fluororesin layer is thinned by repeated use of the lens driving device 12, and sometimes direct contact occurs between members configuring the lower side guide projections 44 and the lower side guide grooves 46. However, the first movable body plate 26 and the second movable body plate 28 configuring the second guide mechanism 42 are configured from a resin composition resulting from mixing a liquid crystal polymer together with a fluororesin. This means that fluororesin would appear at the surface even if the fluororesin layer on the surface were to disappear, enabling a high friction coefficient to be avoided.

After the lens support body 20 and the first movable body plate 26 have moved in the X direction, a current supply to the second coil 74 is turned off. When this is performed, the lens support body 20 together with the first movable body plate 26 stop at their positions of the current supply to the second coil 74 being turned off due to the attraction force between the first magnet 52 and the first magnetic member 56, the attraction three between the second magnet 54 and the second magnetic member 58, friction between the lower side guide projections 44 and the lower side guide grooves 46, and friction between the upper side guide projections 48 and the upper side guide grooves 50.

The third magnet 66, the third coil 76, and the third magnetic member 70 configure a drive mechanism to move the movable body 18 in the optical axis direction with respect to the fixed body 16. When the third coil 76 is supplied with an electricity, a current flows in the X direction in the third coil 76. Since the third magnet 66 opposing the third coil 76 generates magnetic flux in the Y direction, a Lorentz force acts on the third coil 76 in the Z direction. Since the third coil 76 is fixed to the base 80, a repulsion effect acting oh the third magnet 66 acts as a drive force on the movable body 18, such that the movable body 18 moves in the Z direction, guided by the optical axis direction guide mechanism 102. Namely, the lens support body 20 moves in the optical axis direction.

In the optical axis direction guide mechanism 102, the side guide shaft 108 and the +X side guide hole 110 slide against each other, and the −X side guide shaft 112 and the −X side guide groove 114 slide against each other. The fluororesin layer is provided on the respective sliding portions on the +X side guide hole 110 and the −X side guide groove 114, and so a low friction coefficient is maintained at these sliding portion, and they slide smoothly against each other. The fluororesin layer thins and sometimes there is direct contact between members configuring the +X side guide shaft 108 and the +X side guide hole 110 or the −X side guide shaft 112 and the −X side guide groove 114. However, the second movable body plate 28 is configured from a resin composition resulting from mixing a liquid crystal polymer together with a fluororesin and so fluororesin appears at the surface even if the fluororesin layer on the surface were to disappear, enabling a high friction coefficient to be avoided.

After the movable body 18 has moved in the Z direction, a current supply to the third coil 76 is turned off, and the lens support body 20 contained in the movable body 18 stops at its position of the current supply to the third coil 76 being turned off due to the attraction force between the third magnet 66 and the third magnetic member 70, friction between the +X side guide shaft 108 and the +X side guide hole 110, and friction between the −X side guide shaft 112 and the −X side guide groove 114.

Consider a situation in which the camera device 10 is subjected to shock in the Y direction. Even were the +X side guide shaft 108 and the +X side guide hole 110, and the −X side guide shaft 112 and the −X side guide groove 114 to move away from one another, such movement away would be over a minute distance and the respective components would promptly return to their original positions, such that any damage sustained would be negligible. There is substantially no damage due to the lower side guide projections 44A, 44B and the lower side guide grooves 46A, 46B, as well as the upper side guide projections 48A, 48B and the upper side guide grooves 50A, 50B, being respectively retained in a state of contact.

Consider a situation in which the camera device 10 is subjected to shock in the X direction. There is substantially no damage due to the +X side guide shaft 108 and the +X side guide hole 110, the −X side guide shaft 112 and the −X side guide groove 114, the lower side guide projections 44A, 44B and the lower side guide grooves 46A, 46B, and the upper side guide projections 48A, 48B and the upper side guide grooves 50A, 50B being respectively retained in a state of contact.

Consider a situation in Which the camera device 10 is subjected to shock in the Z direction. There is substantially no damage due to the +X side guide shaft 108 and the +X side guide hole 110, and the −X side guide shaft 112 and the −X side guide groove 114, being retained in a state of contact. Even were the lower side guide projections 44A, 44B and the lower side guide grooves 46A, 46B, and the upper side guide projections 48A, 48B and the upper side guide grooves 50A, 50B, to move away from one another, such movement away would be over a minute distance and the respective components would promptly return to their original positions, and there would be substantially no damage due to these respective components being in line contact or face-to-face contact states.

Thus, regardless of the direction in which the camera device 10 is subjected to shock, any damage sustained by the lens driving device 12 of the present exemplary embodiment is negligible, or substantially no damage is sustained. This enables smooth movement of the lens support body 20 in each of the X, Y, and Z directions to be secured.

In the exemplary embodiment described above, explanation has been given regarding an example in which the lower side guide projections 44 and the upper side guide projections 48 are provided to the first movable body plate 26, the opposing, lower side guide grooves 46 are provided to the second movable body plate 28, and the opposing upper side guide grooves 50 are formed on the lens support body 20. However, the arrangement of projections and grooves may be switched around, such that guide grooves are formed in upper and lower faces of the first movable body plate 26, and guide projections are formed on the second movable body plate 28 and the lens support body 20 so as to oppose these. Alternatively, the arrangement may be switched around on the upper side alone or on the lower side alone.

Moreover, in the exemplary embodiment described above, explanation has been given regarding an example in which the first coil 72, the second coil 74, the third coil 76, and the third magnetic member 70 are attached to the fixed body 16, and the first magnet 52, the second magnet 54, and the third magnet 66 are attached to the movable body 18. However, the first coil 72, the second coil 74, the third coil 76, and the third magnetic member 70 max be attached to the movable body 18, while the first magnet 52, the second magnet 54, and the third magnet 66 may be attached to the fixed body 16.

Note that the lens support body 20 the first movable body plate 26, and the second movable body plate 28 may be configured just at the portions forming the guide projections or the guide grooves from a resin composition resulting from mixing a liquid crystal polymer together with a fluororesin. Thus, for example, application may be made to cases in which these members are formed from separate bodies of body portions and sliding portions, in a configuration in which these have been integrally combined.

Moreover, although explanation has been given of cases in which both members in each combination are configured from a resin composition resulting from mixing a liquid crystal polymer together with a fluororesin, a configuration may be adopted in which just one of these members is configured from a resin composition resulting from mixing a liquid crystal polymer together with a fluororesin. Moreover, although explanation has been given of cases in which the fluororesin layer is provided to sliding portions of both the guide projections and the guide grooves, the fluororesin layer may be provided to just one thereof.

In the exemplary embodiment described above, explanation has been given regarding the lens driving device 12 employed in the camera device 10. However, the present invention may also be applied in other devices.

The invention claimed is:

1. A lens driving device comprising:
a guide mechanism configured to guide movement of a lens; wherein
the guide mechanism includes a first member formed with a guide projection having a sliding surface and a second member formed with a guide groove having a counter sliding surface on which the sliding surface of the guide projection slides;
at least one portion, from out of a portion of the first member where at least the guide projection is formed or a portion of the second member where at least the guide groove is formed, is configured from a resin composition resulting from mixing both a liquid crystal polymer and a fluororesin; and
a fluororesin layer is further provided on at least one out of the sliding surface of the guide projection or the counter sliding surface of the guide groove that are made of the resin composition in such a manner that the fluororesin layer is interposed between the guide projection and the guide groove.

2. A lens driving device comprising:
a lens support body configured to support a lens;
a frame configured to support the lens support body; and
a guide mechanism provided to a specific member configuring the lens support body and the frame, and configured to guide the lens support body so as to be movable in a direction orthogonal to an optical axis direction of the lens with respect to the specific member; wherein
the guide mechanism includes a guide projection having a sliding surface and a guide groove having a counter sliding surface on which the sliding surface of the guide projection slides;
at least one portion, from out of a portion of the specific member and the lens support body where at least the guide projection is formed or a portion of the specific member and the lens support body where at least the guide groove is formed, is configured from a resin composition resulting from mixing both a liquid crystal polymer and a fluororesin; and
a fluororesin layer is further provided on at least one out of the sliding surface of the guide projection or the counter sliding surface of the guide groove that are made of the resin composition in such a manner that the fluororesin layer is interposed between the guide projection and the guide groove.

3. A lens driving device comprising:
a lens support body configured to support a lens; and
a guide mechanism that includes a guide shaft and a sliding portion having a sliding surface that slides on the guide shaft and that is configured to guide the lens support body in an optical axis direction; wherein
the sliding portion is configured from a resin composition resulting from mixing both a liquid crystal polymer and a fluororesin; and
a fluororesin layer is further provided on the sliding surface of the sliding portion that is made of the resin composition in such a manner that the fluororesin layer is interposed between the guide projection and the guide groove.

4. The lens driving device according to claim 1, wherein the fluororesin is polytetrafluoroethylene.

5. The lens driving device according to claim 2, wherein the fluororesin is polytetrafluoroethylene.

6. The lens driving device according to claim 3, wherein the fluororesin is polytetrafluoroethylene.

7. The lens driving device according to claim 1, wherein the fluororesin layer is a polytetrafluoroethylene layer.

8. The lens driving device according to claim 2, wherein the fluororesin layer is a polytetrafluoroethylene layer.

9. The lens driving device according to claim 3, wherein the fluororesin layer is a polytetrafluoroethylene layer.

10. A camera device comprising:
a lens driving device; and
a lens supported by a lens support body, wherein
the lens driving device includes:
  a guide mechanism configured to guide movement of a lens; wherein
  the guide mechanism includes a first member formed with a guide projection having a sliding surface and a second member formed with a guide groove having a sliding surface on which the guide projection slides;
  at least one portion, from out of a portion of the first member where at least the guide projection is formed or a portion of the second member where at least the guide groove is formed, is configured from a resin composition resulting from mixing both a liquid crystal polymer and a fluororesin; and
  a fluororesin layer is further provided on the sliding surface of at least one out of the guide projection or the guide groove that are made of the resin composition in such a manner that the fluororesin layer is interposed between the guide projection and the guide groove.

11. A camera device comprising:
a lens driving device; and
a lens supported by a lens support body, wherein
the lens driving device includes:
  a lens support body configured to support a lens;
  a frame configured to support the lens support body; and
  a guide mechanism provided to a specific member configuring the lens support body and the frame, and configured to guide the lens support body so as to be movable in a direction orthogonal to an optical axis direction of the lens with respect to the specific member; wherein
  the guide mechanism includes a guide projection having a sliding surface and a guide groove having a sliding surface on which the guide projection slides;
  at least one portion, from out of a portion of the specific member and the lens support body where at least the guide projection is formed or a portion of the specific member and the lens support body where at least the guide groove is formed, is configured from a resin composition resulting from mixing both a liquid crystal polymer and a fluororesin; and
  a fluororesin layer is further provided on the sliding surface of at least one out of the guide projection or the guide groove that are made of the resin composition in such a manner that the fluororesin layer is interposed between the guide projection and the guide groove.

12. A camera device comprising:
a lens driving device; and
a lens supported by a lens support body, wherein
the lens driving device includes:
  a lens support body configured to support a lens; and
  a guide mechanism that includes a guide shaft and a sliding portion having a sliding surface that slides on the guide shaft and that is configured to guide the lens support body in an optical axis direction; wherein
  the sliding portion is configured from a resin composition resulting from mixing both a liquid crystal polymer and a fluororesin; and
  a fluororesin layer is further provided on the sliding surface of the sliding portion that is made of the resin composition in such a manner that the fluororesin layer is interposed between the guide projection and the guide groove.

13. An electronic apparatus comprising a camera device including:
a lens driving device; and
a lens supported by a lens support body, wherein
the lens driving device includes:
  a guide mechanism configured to guide movement of a lens; wherein
  the guide mechanism includes a first member formed with a guide projection having a sliding surface and a second member formed with a guide groove having a sliding surface on which the guide projection slides;

at least one portion, from out of a portion of the first member where at least the guide projection is formed or a portion of the second member where at least the guide groove is formed, is configured from a resin composition resulting from mixing both a liquid crystal polymer and a fluororesin; and a fluororesin layer is further provided on the sliding surface of at least one out of the guide projection or the guide groove that are made of the resin composition in such a manner that the fluororesin layer is interposed between the guide projection and the guide groove.

14. An electronic apparatus comprising a camera device including:

a lens driving device; and a lens supported by a lens support body, wherein the lens driving device includes:

a lens support body configured to support a lens;

a frame configured to support the lens support body; and a guide mechanism provided to a specific member configuring the lens support body and the frame, and configured to guide the lens support body so as to be movable in a direction orthogonal to an optical axis direction of the lens with respect to the specific member; wherein the guide mechanism includes a guide projection having a sliding surface and a guide groove having a sliding surface on which the guide projection slides;

at least one portion, from out of a portion of the specific member and the lens support body where at least the guide projection is formed or a portion of the specific member and the lens support body where at least the guide groove is formed, is configured from a resin composition resulting from mixing both a liquid crystal polymer and a fluororesin; and a fluororesin layer is further provided on the sliding surface of at least one out of the guide projection or the guide groove that are made of the resin composition in such a manner that the fluororesin layer is interposed between the guide projection and the guide groove.

15. An electronic apparatus comprising a camera device including:

a lens driving device; and a lens supported by a lens support body, wherein the lens driving device includes:

a lens support body configured to support a lens; and a guide mechanism that includes a guide shaft and a sliding portion having a sliding surface that slides on the guide shaft and that is configured to guide the lens support body in an optical axis direction; wherein the sliding portion is configured from a resin composition resulting from mixing both a liquid crystal polymer together with a fluororesin; and a fluororesin layer is further provided on the sliding surface of the sliding portion that is made of the resin composition in such a manner that the fluororesin layer is interposed between the guide projection and the guide groove.

* * * * *